US012656937B2

(12) United States Patent
    Park

(10) Patent No.: US 12,656,937 B2
(45) Date of Patent: Jun. 16, 2026

(54) ELECTRONIC DEVICE AND CONTROL METHOD THEREOF USING A WEARABLE DEVICE

(71) Applicant: SAMSUNG ELECTRONICS CO., LTD., Suwon-si (KR)

(72) Inventor: Jaesung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/012,528

(22) Filed: Jan. 7, 2025

(65) Prior Publication Data

US 2025/0138710 A1      May 1, 2025

Related U.S. Application Data

(63) Continuation of application No. PCT/KR2023/010357, filed on Jul. 19, 2023.

(30) Foreign Application Priority Data

Sep. 8, 2022    (KR) ........................ 10-2022-0114513

(51) Int. Cl.
    *G06F 3/04842*      (2022.01)
    *G06F 1/16*         (2006.01)
    *G06F 21/30*        (2013.01)

(52) U.S. Cl.
    CPC .......... *G06F 3/04842* (2013.01); *G06F 1/163* (2013.01); *G06F 21/30* (2013.01)

(58) Field of Classification Search
    CPC .. G06F 3/04842; G06F 3/041; G06F 3/04883; G06F 3/0416; G06F 3/04847;
    (Continued)

(56) References Cited

U.S. PATENT DOCUMENTS 9,521,245 B2    12/2016  Yang
9,871,546 B2     1/2018  Aoki
        (Continued)

FOREIGN PATENT DOCUMENTS

JP       2008-167210 A    7/2008
JP       2017-54480 A     3/2017
        (Continued)

OTHER PUBLICATIONS

International Search Report (PCT/ISA/210) issued Nov. 3, 2023 by the International Searching Authority in International Application No. PCT/KR2023/010357.

(Continued)

*Primary Examiner* — Stephen G Sherman
(74) *Attorney, Agent, or Firm* — Sughrue Mion, PLLC

(57)                ABSTRACT

An electronic device and a control method thereof are disclosed. The method includes based on identifying that a wearable device has a control UI function, controlling at least one of the display or the speaker to provide a request for identifying whether the wearable device has control authority associated with at least one function of the electronic device; based on identifying that the wearable device has the control authority, identifying a first control UI of the wearable device corresponding to the at least one function of (Continued)

the electronic device; displaying a GUI for the at least one function of the electronic device and a GUI for the first control UI, and in response to receiving user interaction information input from the wearable device and associated with the first control UI, controlling the electronic device based on the user interaction information and the at least one function of the electronic device.

20 Claims, 15 Drawing Sheets

(58) Field of Classification Search
CPC . G06F 3/167; G06F 1/16; G06F 1/163; G06F 21/30; H04R 25/554; H04R 2430/01; H04R 1/1041; H04N 21/422; H04W 4/80
See application file for complete search history.

(56) References Cited

U.S. PATENT DOCUMENTS

| | | | |
|---|---|---|---|
| 10,437,357 B2 | 10/2019 | Park et al. | |
| 10,509,478 B2 | 12/2019 | Poupyrev et al. | |
| 10,542,357 B2 | 1/2020 | Lee et al. | |
| 11,237,719 B2 | 2/2022 | Mistry et al. | |

| | | | | |
|---|---|---|---|---|
| 2015/0358043 | A1 | 12/2015 | Jeong et al. | |
| 2017/0102837 | A1* | 4/2017 | Toumpelis | H04L 65/612 |
| 2018/0241863 | A1* | 8/2018 | Lee | H04R 25/558 |
| 2019/0129176 | A1 | 5/2019 | Endo et al. | |

FOREIGN PATENT DOCUMENTS

| | | | |
|---|---|---|---|
| KR | 10-2015-0045257 | A | 4/2015 |
| KR | 10-2015-0140212 | A | 12/2015 |
| KR | 10-1774842 | B1 | 9/2017 |
| KR | 10-2018-0005491 | A | 1/2018 |
| KR | 10-2018-0037511 | A | 4/2018 |
| KR | 10-1910780 | B1 | 10/2018 |
| KR | 10-2087989 | B1 | 3/2020 |
| KR | 10-2169952 | B1 | 10/2020 |
| KR | 10-2369589 | B1 | 3/2022 |

OTHER PUBLICATIONS

Written Opinion (PCT/ISA/237) issued Nov. 3, 2023 by the International Searching Authority in International Application No. PCT/KR2023/010357.
Communication issued on Mar. 26, 2026 by the Korean Ministry of Intellectual Property (MOIP) in Korean Patent Application No. 10-2022-0114513.

* cited by examiner

FIG. 11

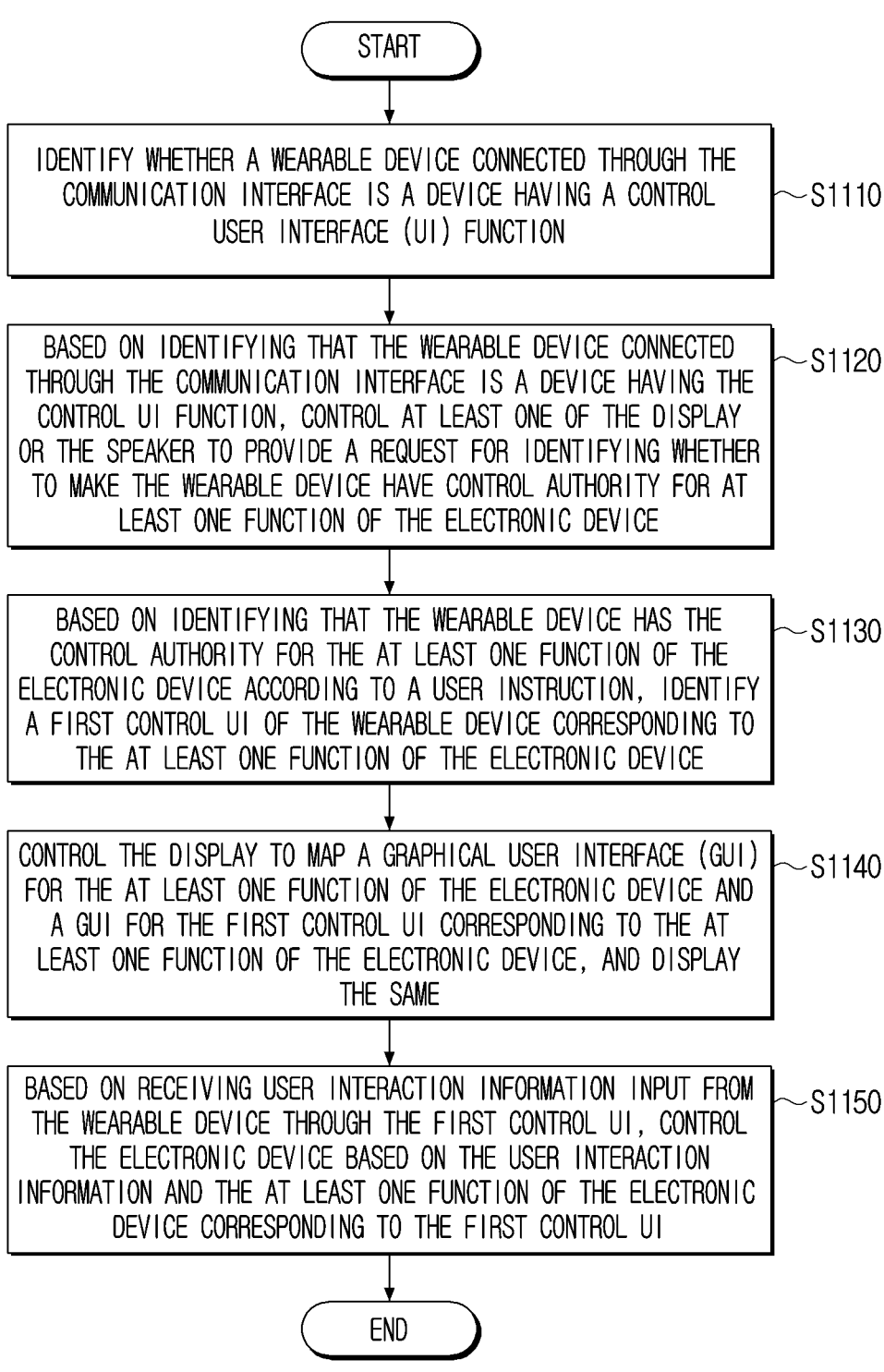

START

IDENTIFY WHETHER A WEARABLE DEVICE CONNECTED THROUGH THE
COMMUNICATION INTERFACE IS A DEVICE HAVING A CONTROL
USER INTERFACE (UI) FUNCTION ~S1110

BASED ON IDENTIFYING THAT THE WEARABLE DEVICE CONNECTED
THROUGH THE COMMUNICATION INTERFACE IS A DEVICE HAVING THE
CONTROL UI FUNCTION, CONTROL AT LEAST ONE OF THE DISPLAY
OR THE SPEAKER TO PROVIDE A REQUEST FOR IDENTIFYING WHETHER
TO MAKE THE WEARABLE DEVICE HAVE CONTROL AUTHORITY FOR AT
LEAST ONE FUNCTION OF THE ELECTRONIC DEVICE ~S1120

BASED ON IDENTIFYING THAT THE WEARABLE DEVICE HAS THE
CONTROL AUTHORITY FOR THE AT LEAST ONE FUNCTION OF THE
ELECTRONIC DEVICE ACCORDING TO A USER INSTRUCTION, IDENTIFY
A FIRST CONTROL UI OF THE WEARABLE DEVICE CORRESPONDING TO
THE AT LEAST ONE FUNCTION OF THE ELECTRONIC DEVICE ~S1130

CONTROL THE DISPLAY TO MAP A GRAPHICAL USER INTERFACE (GUI)
FOR THE AT LEAST ONE FUNCTION OF THE ELECTRONIC DEVICE AND
A GUI FOR THE FIRST CONTROL UI CORRESPONDING TO THE AT
LEAST ONE FUNCTION OF THE ELECTRONIC DEVICE, AND DISPLAY
THE SAME ~S1140

BASED ON RECEIVING USER INTERACTION INFORMATION INPUT FROM
THE WEARABLE DEVICE THROUGH THE FIRST CONTROL UI, CONTROL
THE ELECTRONIC DEVICE BASED ON THE USER INTERACTION
INFORMATION AND THE AT LEAST ONE FUNCTION OF THE ELECTRONIC
DEVICE CORRESPONDING TO THE FIRST CONTROL UI ~S1150

END

ELECTRONIC DEVICE AND CONTROL METHOD THEREOF USING A WEARABLE DEVICE

CROSS-REFERENCE TO RELATED APPLICATIONS

This application is a bypass continuation of International Application No. PCT/KR2023/010357, filed on Jul. 19, 2023, with the Korean Intellectual Property office, which claims priority from Korean Application No. 10-2022-0114513, filed on Sep. 8, 2022, with the Korean Intellectual Property office, the disclosures of which are incorporated herein by reference in their entireties.

BACKGROUND

1. Field

The disclosure relates to an electronic device and a control method thereof, and more particularly, to an electronic device that controls functions of the electronic device through a control user interface (UI) included in a wearable device by making the wearable device have control authority for the electronic device, and a control method thereof.

2. Related Art

A wearable device means an electronic device that is utilized by being worn on a body. As examples of a wearable device, there are, for example, digital glasses worn on a face, a smart watch worn on a wrist, wireless earphones and headphones worn on ears, and other health care devices that can be worn on shoulders, arms, and legs, etc. A wearable device is worn in a state of directly contacting a body, but it is also worn in a state of being combined with clothes, accessories, and shoes.

A wearable device is used solely for its intrinsic function in some cases, but it is also utilized while being interlocked with another electronic device, e.g., a display device, a computer, a smartphone, etc. Recently, smart watches and wireless earphones that are interlocked with smartphones are being widely used.

A wearable device can also be used while being interlocked with various types of display devices. Wireless earphones, smart watches, etc. can be connected with display devices, and contents output from the display devices can be made to be output from the wearable devices.

SUMMARY

An electronic device according to an embodiment of the disclosure for achieving the aforementioned purpose includes a communication interface, a display, a speaker, memory storing at least one instruction, and at least one processor configured to execute the at least one instruction. The at least one processor may identify whether a wearable device connected through the communication interface has a control user interface (UI) function, based on identifying that the wearable device connected through the communication interface has the control UI function, control at least one of the display or the speaker to provide a request for identifying whether the wearable device has control authority associated with at least one function of the electronic device, based on identifying that the wearable device has the control authority associated with the at least one function of the electronic device, identify a first control UI of the wearable device corresponding to the at least one function of the electronic device, control the display to display a graphical user interface (GUI) for the at least one function of the electronic device and a GUI for the first control UI corresponding to the at least one function of the electronic device, and in response to receiving user interaction information input from the wearable device and associated with the first control UI, control the electronic device based on the user interaction information and the at least one function of the electronic device.

A control method of an electronic device according to an embodiment of the disclosure includes the operations of identifying whether a wearable device connected through a communication interface has a control user interface (UI) function; based on identifying that the wearable device connected through the communication interface has the control UI function, controlling at least one of a display or a speaker to provide a request for identifying whether the wearable device has control authority associated with at least one function of the electronic device; based on identifying that the wearable device has the control authority associated with the at least one function of the electronic device, identifying a first control UI of the wearable device corresponding to the at least one function of the electronic device; controlling the display to display a graphical user interface (GUI) for the at least one function of the electronic device and a GUI for the first control UI corresponding to the at least one function of the electronic device, and in response to receiving user interaction information input from the wearable device and associated with the first control UI, controlling the electronic device based on the user interaction information and the at least one function of the electronic device.

A non-transitory computer readable recording medium storing computer instructions that, when executed by a processor of an electronic device, make the electronic device perform operations. According to an embodiment of the disclosure, the operations may include identifying whether a wearable device connected through a communication interface has a control user interface (UI) function; based on identifying that the wearable device connected through the communication interface has the control UI function, controlling at least one of a display or a speaker to provide a request for identifying whether the wearable device has control authority associated with at least one function of the electronic device; based on identifying that the wearable device has the control authority associated with the at least one function of the electronic device, identifying a first control UI of the wearable device corresponding to the at least one function of the electronic device; controlling the display to display a graphical user interface (GUI) for the at least one function of the electronic device and a GUI for the first control UI corresponding to the at least one function of the electronic device, and in response to receiving user interaction information input from the wearable device and associated with the first control UI, controlling the electronic device based on the user interaction information and the at least one function of the electronic device.

BRIEF DESCRIPTION OF THE DRAWINGS

Aspects, characteristics, and advantages of specific embodiments of the disclosure will become clearer through the following description with reference to the accompanying drawings.

FIG. 11 is a flow chart for illustrating an operation of an electronic device according to an embodiment of the disclosure.

DETAILED DESCRIPTION

Figure 1:
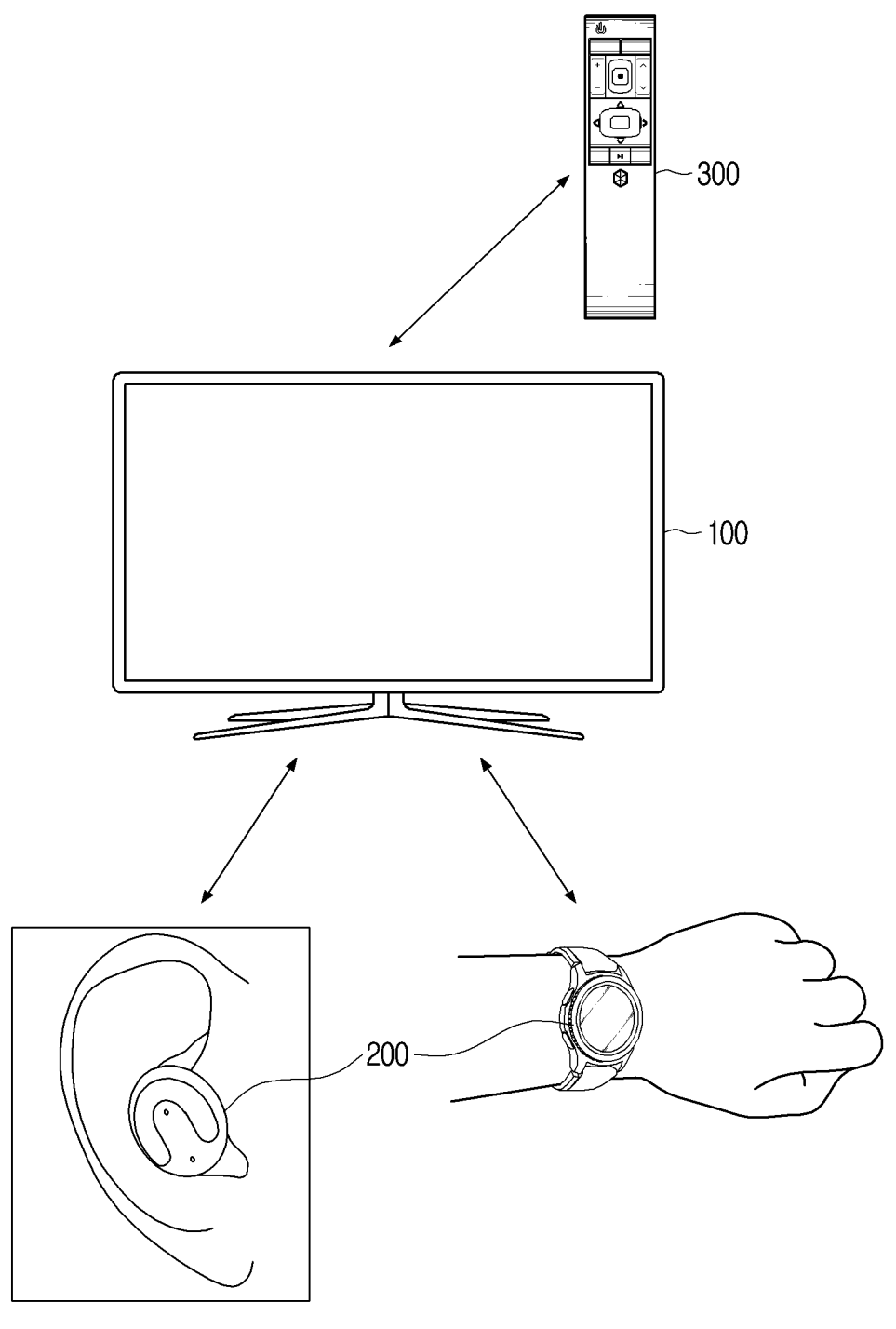
FIG. 1 is a diagram for illustrating an electronic device, a wearable device, and a remote control device according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, and/or alternatives of the embodiments of the disclosure. Also, with respect to the detailed description of the drawings, similar components may be designated by similar reference numerals.

Also, in case it is determined that in describing the disclosure, detailed explanation of related known functions or components may unnecessarily confuse the gist of the disclosure, the detailed explanation will be omitted.

In addition, the embodiments below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Further, the terms used in the disclosure are used just to explain specific embodiments of the disclosure, and are not intended to limit the scope of the other embodiments. In addition, singular expressions include plural expressions, unless defined obviously differently in the context.

Also, in the disclosure, expressions such as "have," "may have," "include," and "may include" denote the existence of such characteristics (e.g.: elements such as numbers, functions, operations, and components), and do not exclude the existence of additional characteristics.

In addition, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Further, the expressions "first," "second," and the like used in the disclosure may describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" may not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Also, in the embodiments of the disclosure, 'a module' or 'a unit' may perform at least one function or operation, and may be implemented as hardware or software, or as a combination of hardware and software. Further, a plurality of 'modules' or 'units' may be integrated into at least one module and implemented as at least one processor, excluding 'a module' or 'a unit' that needs to be implemented as specific hardware.

Meanwhile, various elements and areas in the drawings were illustrated schematically. Accordingly, the technical idea of the disclosure is not limited by the relative sizes or intervals illustrated in the accompanying drawings.

Hereinafter, the embodiments according to the disclosure will be described in detail with reference to the accompanying drawings, such that those having ordinary knowledge in the art to which the disclosure belongs can easily carry out the disclosure.

FIG. 1 is a diagram for illustrating an electronic device, a wearable device, and a remote control device according to an embodiment of the disclosure.

Referring to FIG. 1, an electronic device 100 may be a device that outputs a visual content or an auditory content, and provide the content to a user. The electronic device 100 may be implemented as, for example, various devices that include a display 120 and can reproduce video contents such as a smart TV, a tablet, a monitor, a smartphone, a desktop computer, a laptop computer, etc.

The electronic device 100 according to an embodiment of the disclosure is not limited to the aforementioned devices, and the electronic device 100 can be implemented as an electronic device 100 equipped with two or more functions of the aforementioned devices.

Also, the electronic device 100 according to an embodiment of the disclosure may be connected with another external device, and perform operations for performing one or more functions. For example, the electronic device 100 may be connected with at least one of a digital video disk (DVD) player or a media box (e.g.: Samsung HomeSync™, Apple TV™, or Google TV™), and perform operations for performing one or more functions.

The electronic device 100 may perform various control operations by performing communicative connection with a wearable device and a remote control device.

Here, the remote control device may be a user terminal that receives a user input regarding control of the electronic device 100, e.g., a remote control.

Also, the wearable device may be wireless earphones or a smart watch. However, the disclosure is not limited thereto, and the wearable device may be various electronic devices 100 that can be worn on a body.

The electronic device 100 may perform a control operation of the electronic device 100 based on a control signal received from a remote control device.

Also, the electronic device 100 may perform a control operation of the electronic device 100 based on a control signal received from a wearable device.

Here, the electronic device 100 may identify a control user interface (UI) included in a wearable device corresponding to at least one function of the electronic device 100, or allot control authority for the at least one function of the electronic device 100 to the control UI included in the wearable device by performing communicative connection with the wearable device.

Accordingly, the electronic device 100 may perform various functions by controlling components included in the electronic device 100 based on a control signal received from the wearable device through the communication interface 110.

Figure 2:
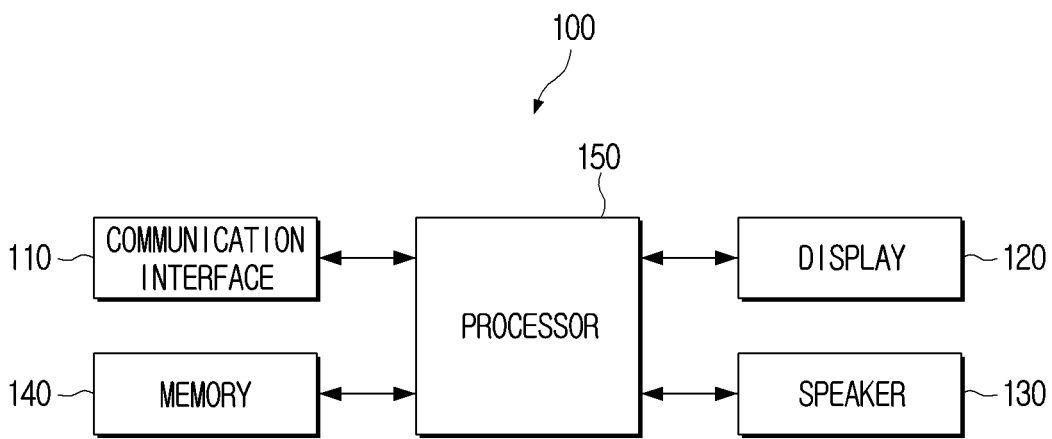
FIG. 2 is a block diagram for illustrating a configuration of an electronic device according to an embodiment of the disclosure.

FIG. 2 is a block diagram for illustrating a configuration of the electronic device 100 according to an embodiment of the disclosure.

Referring to FIG. 2, the electronic device 100 may include a communication interface 110, a display 120, a speaker 130, memory 140, and a processor 150.

However, the disclosure is not limited thereto, and the electronic device 100 may further include components for performing various functions by being connected with a wearable device.

The communication interface 110 may include a wireless communication interface 110, a wired communication interface 110, or an input interface. The wireless communication interface 110 may perform communication with various types of external devices by using a wireless communication technology or a mobile communication technology. As such a wireless communication technology, for example, Bluetooth, Bluetooth Low Energy, CAN communication, Wi-Fi, Wi-Fi Direct, ultra-wideband (UWB) communication, Zigbee, infrared Data Association (IrDA) communication, or near field communication (NFC), etc. may be included, and as a mobile communication technology, 3GPP, Wi-Max, Long Term Evolution (LTE), 5G, etc. may be included.

The wireless communication interface 110 may be implemented by using an antenna that can transmit an electromagnetic wave to the outside or receive an electromagnetic wave transmitted from the outside, a communication chip, and a substrate, etc.

The wired communication interface 110 may perform communication with various types of external devices based on a wired communication network. Here, the wired communication network may be implemented, for example, by using a physical cable such as a pair cable, a coaxial cable, an optical fiber cable, or an Ethernet cable, etc.

Any one of the wireless communication interface 110 or the wired communication interface 110 may be omitted depending on embodiments. Accordingly, the electronic device 100 may include only the wireless communication interface 110 or include only the wired communication interface 110. In addition, the electronic device 100 may include an integrated communication interface 110 that supports both wireless connection by the wireless communication interface 110 and wired connection by the wired communication interface 110.

The electronic device 100 is not limited to a case of including one communication interface 110 that performs communicative connection by one method, but may include a plurality of communication interfaces 110 that perform communicative connection by a plurality of methods.

The processor 150 may perform communicative connection with another device through the communication interface 110, and transmit/receive control signals.

The processor 150 may perform communicative connection with a wearable device through the communication interface 110, and receive information on a control UI included in the wearable device, and information on a user interaction and a control signal input through the control UI.

The processor 150 may perform communicative connection with a remote control device through the communication interface 110, and receive information on a control UI of the remote control device, and information on a user interaction and a control signal input through the control UI.

The processor 150 may perform communicative connection with a user terminal through the communication interface 110, and receive UI information, and information on a control signal and an application executed in the user terminal.

However, the disclosure is not limited to the aforementioned embodiment, and the processor 150 may perform communicative connection with an external device, an external server, etc. through the communication interface 110, and transmit or receive signals for various operations according to the purpose of the disclosure.

The display 120 may include various types of display panels 120 such as a liquid crystal display (LCD) panel, an organic light-emitting diodes (OLED) panel, active-matrix organic light-emitting diodes (AM-OLED), liquid crystal on silicon (LcoS), quantum dot light-emitting diodes (QLED) and digital light processing (DLP), a plasma display panel (PDP), an inorganic LED panel, and a micro LED panel, etc., but is not limited thereto. Meanwhile, the display 120 may constitute a touch screen together with a touch panel, or may consist of a flexible panel.

The display 120 may be implemented as a square or a rectangle in a 2D shape, but is not limited thereto, and the display 120 may be implemented as various shapes such as a circle, a polygon, a 3D stereoscopic shape, etc.

The processor 150 may control the display 120 to display various visual contents and a GUI for guiding a control operation of the electronic device 100.

The processor 150 may control the display 120 to display a graphical user interface (GUI) corresponding to at least one function of the electronic device 100 and a GUI for a control UI of a wearable device that performs communicative connection with the electronic device 100 through the communication interface 110.

Specifically, the processor 150 may control the display 120 such that a GUI corresponding to at least one function of the electronic device 100 and a GUI for a control UI of a wearable device are mapped and displayed.

Also, the processor 150 may control the display 120 to display a GUI for user interaction information input through the control UI of the wearable device.

Specifically, the processor 150 may control the display 120 to map a GUI for user interaction information input through the control UI of the wearable device with a GUI for the control UI of the wearable device or a GUI for at least one function of the electronic device 100, and display the same.

The processor 150 may control the display 120 to map a GUI for the control UI of the wearable device and a GUI for a control UI of a remote control device for control of the electronic device 100, and display the same.

However, the disclosure is not limited to what was described above, and the processor 150 may control the display 120 to display various UIs and GUIs for control of the electronic device 100 through the wearable device.

The speaker 130 may consist of a tweeter for reproducing sounds of high-pitched ranges, a mid-range for reproducing sounds of mid-pitched ranges, a woofer for reproducing sounds of low-pitched ranges, a sub-woofer for reproducing sounds of extreme low-pitched ranges, an enclosure for controlling resonance, and a crossover network dividing frequencies of electric signals input into the speaker 130 by each band, etc.

The speaker 130 may output an acoustic signal to the outside of the electronic device 100. The speaker 130 may output reproduction of multimedia, reproduction of recording, various notification sounds, voice messages, etc. The electronic device 100 may include an audio output device such as the speaker 130, but may also include an output device such as an audio output terminal. In particular, the speaker 130 may provide obtained information, information processed·produced based on the obtained information, a response result or an operation result for a user voice, etc. in voice forms.

The processor 150 may control the speaker 130 to output various auditory contents, and guide voices for control operations of the electronic device 100.

Also, the processor 150 may control the speaker 130 to output voices regarding at least one function of the electronic device 100, and voices regarding information on a wearable device connected with the electronic device 100 through the communication interface 110.

Specifically, the processor 150 may control the speaker 130 to output voices regarding information on a control UI included in the wearable device connected with the electronic device 100 through the communication interface 110, and information on user interactions input through the control UI of the wearable device.

Also, the processor 150 may control the speaker 130 to output voices regarding information on mapping of at least one function of the electronic device 100 and the control UI of the wearable device.

In addition, the processor 150 may control the speaker 130 to output voices regarding information on user interactions input through the wearable device, information on the control UI of the wearable device, or information on mapping of at least one function of the electronic device 100.

Further, the processor 150 may control the speaker 130 to output voices regarding information on mapping of the control UI of the wearable device and a control UI of a remote control device for controlling the electronic device 100.

However, the disclosure is not limited to the aforementioned example, and the processor 150 may control the speaker 130 to output voices for performing various control operations of the electronic device 100 according to the disclosure.

The memory 140 stores various types of programs or data temporarily or non-temporarily, and transmits the stored information to the processor 150 according to a call by the processor 150. Also, the memory 140 may store various types of information necessary for operations, and processing or control operations, etc. of the processor 150 in electronic formats.

The memory 140 may include, for example, at least one of a main memory device or an auxiliary memory device. The main memory device may be implemented by using a semiconductor storage medium such as ROM and/or RAM. ROM may include, for example, ROM, EPROM, EEPROM, and/or MASK-ROM, etc. which are general. RAM may include, for example, DRAM and/or SRAM, etc. The auxiliary memory device may be implemented by using at least one storage medium that can store data permanently or semi-permanently like an optical medium such as a flash memory device, a secure digital (SD) card, a solid state drive (SSD), a hard disc drive (HDD), a magnetic drum, a compact disc (CD), a DVD, or a laser disc, etc., a magnetic tape, a magneto-optical disc, and/or a floppy disc, etc.

The memory 140 may store information on at least one function of the electronic device 100, control information of a wearable device that performs communicative connection with the electronic device 100 through the communication interface 110, information on a control UI of the wearable device, and information on user interactions input through the control UI of the wearable device.

The memory 140 may store information on a control UI of a wearable device that performs communicative connection with the electronic device 100 through the communication interface 110, which corresponds to at least one function of the electronic device 100.

The memory 140 may store information on at least one function of the electronic device 100 corresponding to user interaction information input through the control UI of the wearable device.

Other than the above, the memory 140 may store information on various types of GUIs, e.g., a GUI for control information of a wearable device that performs communicative connection with the electronic device 100 through the communication interface 110, a GUI for a control UI of the wearable device, a GUI for user interactions input through the control UI of the wearable device, and mapping information of a GUI for at least one function of the electronic device 100 and a GUI for the control UI of the wearable device, etc.

The processor 150 controls the overall operations of the electronic device 100. Specifically, the processor 150 may be connected with the components of the electronic device 100 including the memory 140 as described above, and control the overall operations of the electronic device 100 by executing the at least one instruction stored in the memory 140 as described above. In particular, the processor 150 may not only be implemented as one processor 150, but also be implemented as a plurality of processors 150.

The processor 150 may be implemented by various methods. For example, the processor 150 may be implemented as at least one of an application specific integrated circuit (ASIC), an embedded processor, a microprocessor, hardware control logic, a hardware finite state machine (FSM), or a digital signal processor (DSP).

Meanwhile, in the disclosure, the processor 150 may include one or more of a central processing unit (CPU) processing digital signals, a micro controller unit (MCU), a micro processing unit (MPU), a controller, an application processor (AP) or a communication processor (CP), and an ARM processor, or may be defined by the terms. Also, the processor 150 may be implemented as a system on chip (SoC) having a processing algorithm stored therein or large scale integration (LSI), or implemented in the form of a field programmable gate array (FPGA). The processor 150 may perform various functions by executing computer executable instructions stored in the memory 140. In addition, for performing artificial intelligence functions, the processor 150 may include at least one of a graphics-processing unit (GPU), a neural processing unit (NPU), or a visual processing unit (VPU), which is a separate AI-dedicated processor.

The processor 150 may identify whether a wearable device connected through the communication interface 110 is a device having a control UI function.

In embodiments where it is identified that a wearable device connected through the communication interface 110 is a device having a control UI function, the processor 150 may control at least one of the display 120 or the speaker 130 to provide a request for identifying whether to make the wearable device have control authority for at least one function of the electronic device 100.

In embodiments where it is identified that the wearable device has the control authority for the at least one function of the electronic device 100 according to a user instruction, the processor 150 may identify a first control UI of the wearable device corresponding to the at least one function of the electronic device 100.

The processor 150 may control the display 120 to map a GUI for at least one function of the electronic device 100 and a GUI for a first control UI corresponding to at least one function of the electronic device 100, and display the same.

When user interaction information input from the wearable device through the first control UI is received, the processor 150 may control the electronic device 100 based on the user interaction information and at least one function of the electronic device 100 corresponding to the first control UI.

Figure 3:
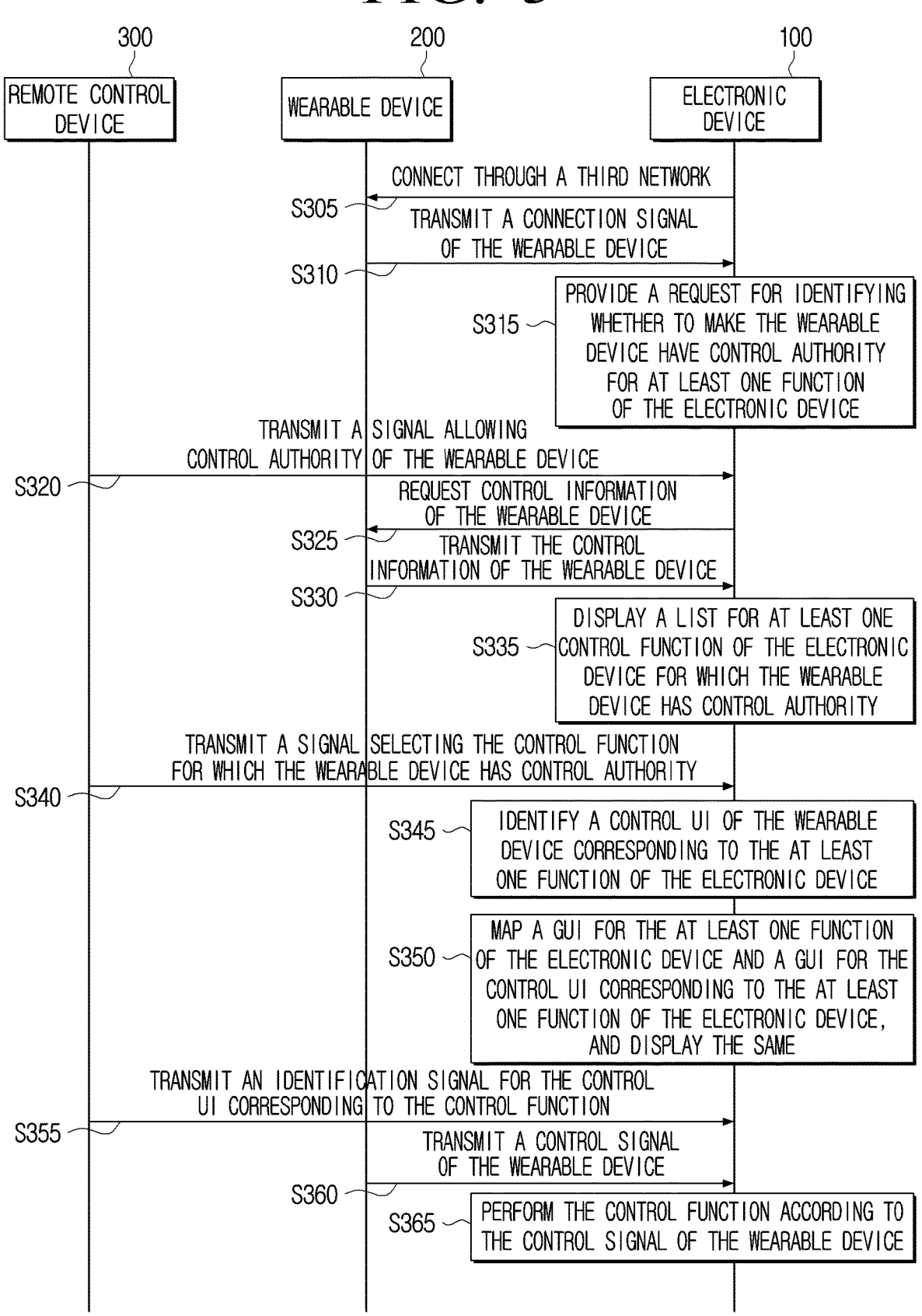
FIG. 3 is a sequence diagram for illustrating an operation of an electronic device according to an embodiment of the disclosure.

The control operation for the components of the electronic device 100 by the processor 150 as described above can be explained together with the wearable device and the remote control device that perform communicative connection with the electronic device 100 through the communication interface 110 in FIG. 3.

FIG. 3 is a sequence diagram for illustrating an operation of the electronic device 100 according to an embodiment of the disclosure.

Referring to FIG. 3, the electronic device 100 may transmit a search signal to a wearable device through the communication interface 110 in the operation S305.

When the search signal is received from the electronic device 100, the wearable device may transmit a connection signal to the electronic device 100, and the electronic device 100 may receive the connection signal transmitted by the wearable device through the communication interface 110 in the operation S310.

When the connection signal is received from the wearable device, the electronic device 100 may control at least one of the display 120 or the speaker 130 to provide a request for identifying whether to make the wearable device have control authority for at least one function (or a control function, referred to as at least one function hereinafter) of the electronic device 100 to the user in the operation S315.

The electronic device 100 may receive a signal allowing control authority of the wearable device for the electronic device 100 from the remote control device through the communication interface 110 in the operation S320.

When the signal allowing control authority of the wearable device for the electronic device 100 is received, the electronic device 100 may transmit a signal requesting control information of the wearable device to the wearable device through the communication interface 110 in the operation S325.

When the signal requesting control information of the wearable device is received, the wearable device may transmit control information of the wearable device to the electronic device 100 in the operation S330.

When the control information of the wearable device is received through the communication interface 110, the electronic device 100 may control the display 120 to display a list for at least one control function of the electronic device 100 for which the wearable device can have control authority in the operation S335. Also, the electronic device 100 may control the speaker 130 to output a voice for a list for at least one control function of the electronic device 100 for which the wearable device can have control authority.

The remote control device may transmit a signal selecting at least one function of the electronic device 100 for which the wearable device has control authority, which was input from the user, to the electronic device 100 in the operation S340.

When the signal selecting at least one function of the electronic device 100 for which the wearable device has control authority is received through the communication interface 110, the electronic device 100 may identify a control UI of the wearable device corresponding to the at least one function of the electronic device 100 in the operation S345. Also, the electronic device 100 may allot control for the at least one function to the control UI of the wearable device.

The electronic device 100 may control the display 120 to map a GUI for the at least one function of the electronic device 100 and a GUI for the control UI corresponding to the at least one function of the electronic device 100, and display the same in the operation S350. Also, the electronic device 100 may control the speaker 130 to output a voice for the mapped GUIs.

The electronic device 100 may perform communicative connection with the remote control device through the communication interface 110, and receive an identification signal for the control UI corresponding to the at least one function of the electronic device 100 in the operation S355. However, the disclosure is not limited thereto, and the electronic device 100 may not perform an operation of receiving an identification signal from the remote control device.

The electronic device 100 may perform communicative connection with the wearable device through the communication interface 110, and receive a control signal of the wearable device for the electronic device 100 in the operation S360.

When the control signal for the electronic device 100 is received from the wearable device, the electronic device 100 may perform at least one function according to the control signal of the wearable device in the operation S365.

Hereinafter, an operation of the processor 150 of the electronic device 100 of controlling each component of the electronic device 100 by performing communicative connection with the wearable device through the communication interface 110 will be described in more detail with reference to FIG. 4 to FIG. 9.

The processor 150 may identify whether the wearable device connected through the communication interface 110 is a device having a control UI function. Here, the processor 150 may identify whether the wearable device connected through the communication interface 110 is a device having a control UI function based on the ID of the wearable device and information on the attributes through the communication interface 110.

If the wearable device connected through the communication interface 110 is identified as a device having a control UI function, the processor 150 may control at least one of the display 120 or the speaker 130 to provide a request for identifying whether to make the wearable device have control authority for at least one function of the electronic device 100.

Figure 4A:
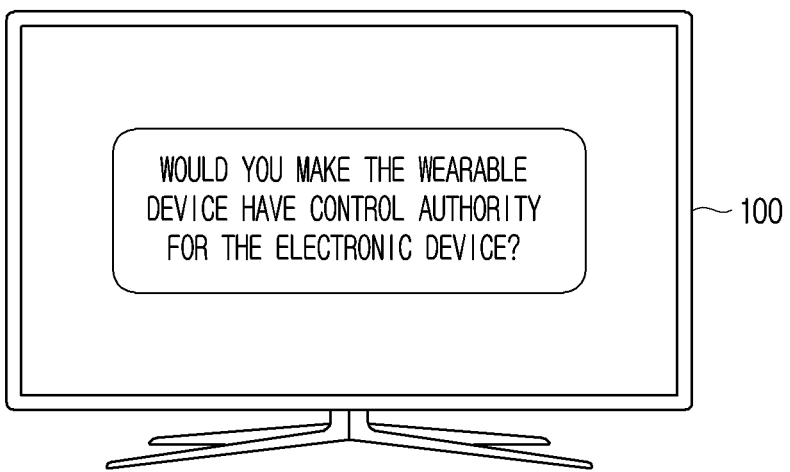
FIG. 4A is a diagram for illustrating an operation of providing a request for identifying whether an electronic device will make a wearable device have control authority for at least one function of the electronic device according to an embodiment of the disclosure.

FIG. 4A is a diagram for illustrating an operation of providing a request for identifying whether the electronic device 100 will make a wearable device have control authority for at least one function of the electronic device 100 according to an embodiment of the disclosure.

Referring to FIG. 4A, the processor 150 may control the display 120 to display a phrase for confirmation which is "Would you make the wearable device have control authority for the electronic device 100?", or control the speaker 130 to output a voice for a phrase for confirmation.

However, the disclosure is not limited to the aforementioned embodiment, and the processor 150 may control the display 120 to display various phrases regarding whether the wearable device connected through the communication interface 110 has control authority for at least one function of the electronic device 100, or control the speaker 130 to output a voice.

Here, the processor 150 may identify at least one function of the electronic device 100 that can be controlled through the wearable device based on control information of the wearable device. For example, in case the wearable device is wireless earphones including a control UI, the processor 150 may identify functions such as volume adjustment, channel change, etc. as functions of the electronic device 100 that can be controlled through wireless earphones.

When at least one function of the electronic device 100 that can be controlled through the wearable device is identified, the processor 150 may control the display 120 to display a list for the identified at least one function of the electronic device 100.

Figure 4B:
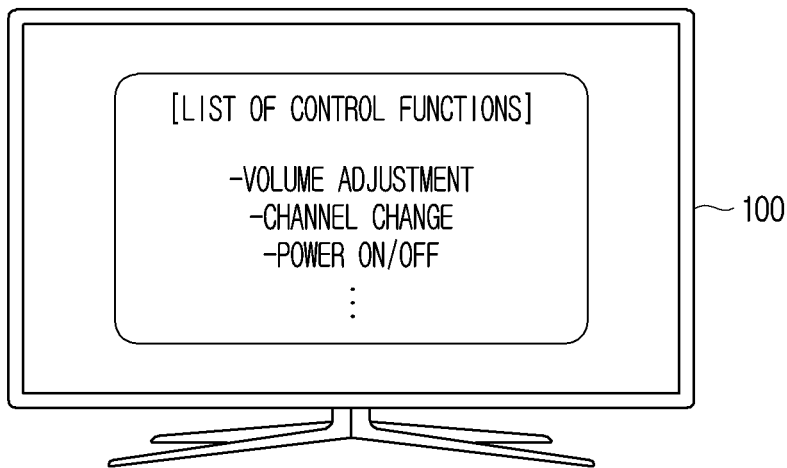
FIG. 4B is a diagram for illustrating an operation of an electronic device of controlling a display to display a list for at least one function of the electronic device that can be controlled through a wearable device according to an embodiment of the disclosure.

FIG. 4B is a diagram for illustrating an operation of the electronic device 100 of controlling the display 120 to display a list for at least one function of the electronic device 100 that can be controlled through a wearable device according to an embodiment of the disclosure.

Referring to FIG. 4B, the processor 150 may control the display 120 to display a list including, e.g., volume adjustment, channel change, power on/off, etc. as at least one function of the electronic device 100 that can be controlled by a wearable device connected through the communication interface 110. Also, the processor 150 may control the speaker 130 to output a voice guiding information for at least one function of the electronic device 100 that can be controlled by a wearable device.

The processor 150 may identify at least one function of the electronic device 100 for which the wearable device has control authority among at least one function of the electronic device 100 included in the list for at least one function of the electronic device 100 that can be controlled by the wearable device based on a user input.

Here, the user input is for selecting at least one function of the electronic device 100 that can be controlled by the wearable device, and it may be a control signal that the processor 150 received through a user interface 180, or received from a remote control device or the wearable device through the communication interface 110.

In embodiments where it is identified that the wearable device has control authority for at least one function of the electronic device 100 according to a user instruction, the processor 150 may identify a first control UI of the wearable device corresponding to the at least one function of the electronic device 100.

Also, the processor 150 may allot control authority for the at least one function of the electronic device 100 to the first control UI of the wearable device connected through the communication interface 110.

Accordingly, the function of the electronic device 100 corresponding to the first control UI may be controlled by receiving a user input from the user through the first control UI included in the wearable device.

The processor 150 may control the display 120 to map a GUI for the at least one function of the electronic device 100 and a GUI for the first control UI corresponding to the at least one function of the electronic device 100, and display the same.

Figure 5:
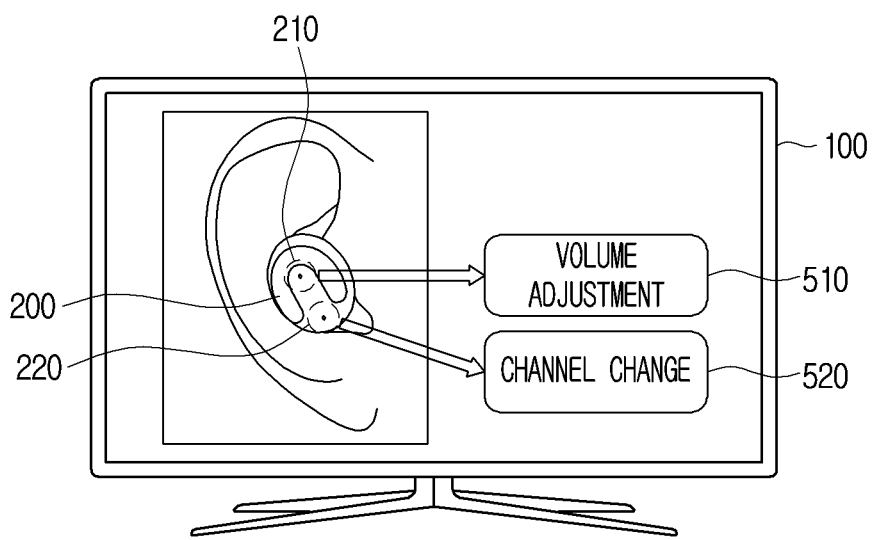
FIG. 5 is a diagram for illustrating an operation of mapping a GUI for at least one function of an electronic device and a GUI for a control UI of a wearable device and displaying the same according to an embodiment of the disclosure.

FIG. 5 is a diagram for illustrating an operation of mapping a GUI for at least one function of the electronic device 100 and a GUI for a control UI of a wearable device and displaying the same according to an embodiment of the disclosure.

Referring to FIG. 5, in case a wearable device connected with the electronic device 100 through the communication interface 110 is wireless earphones, the processor 150 may identify that buttons located on the external surface in a control UI of the wireless earphones correspond to the volume adjustment function 510 and the channel change function 520 among at least one function of the electronic device 100, and control the display 120 to display mapping information.

Specifically, the processor 150 may identify that a first button 210 among the buttons located on the external surface of the wireless earphones corresponds to the volume adjustment function 510, and control the display 120 to map a GUI for the first button 210 and a GUI for the volume adjustment function 510, and display the same. Also, the processor 150 may identify that a second button 220 among the buttons located on the external surface of the wireless earphones corresponds to the channel change function 520, and control the display 120 to map a GUI for the second button 220 and a GUI for the channel change function 520, and display the same.

According to another embodiment, when at least one function of the electronic device 100 for which the wearable device has control authority is identified, the processor 150 may identify first user interaction information for the first control UI corresponding to each of the at least one function of the electronic device 100.

Here, the user interaction information may mean a touch of the user, a voice of the user, a gesture of the user, etc. that the wearable device can detect or receive through the control UI.

Figure 6A:
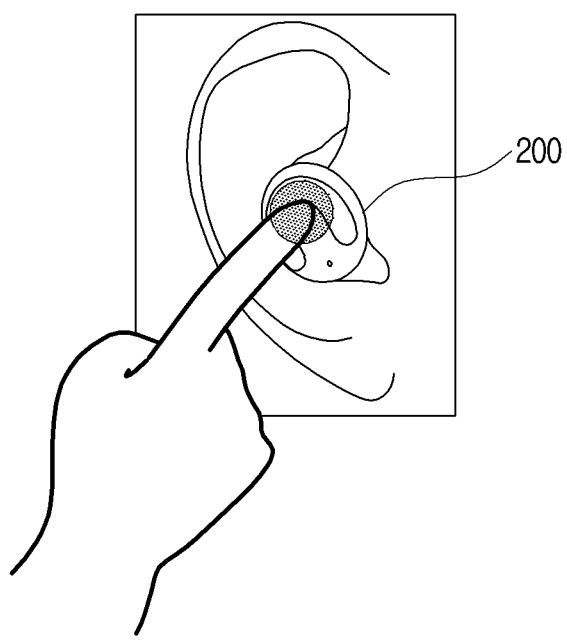
FIG. 6A is a diagram for illustrating a user interaction that is input through a wearable device for controlling at least one function of an electronic device according to an embodiment of the disclosure.
Figure 6B:
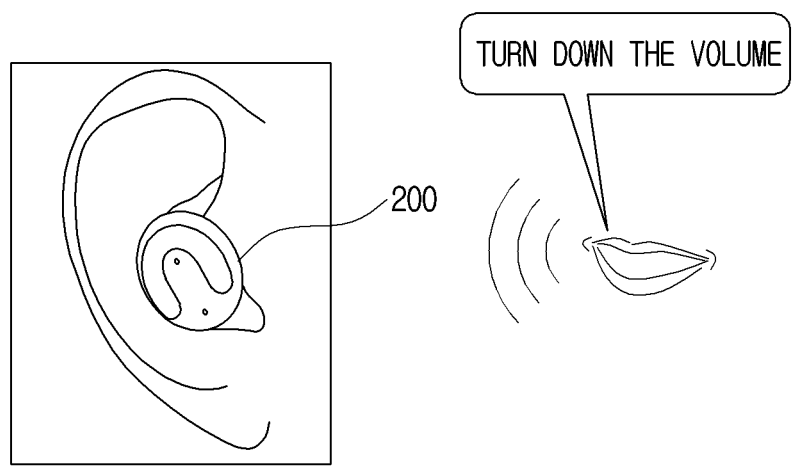
FIG. 6B is a diagram for illustrating a user interaction that is input through a wearable device for controlling at least one function of an electronic device according to an embodiment of the disclosure.
Figure 6C:
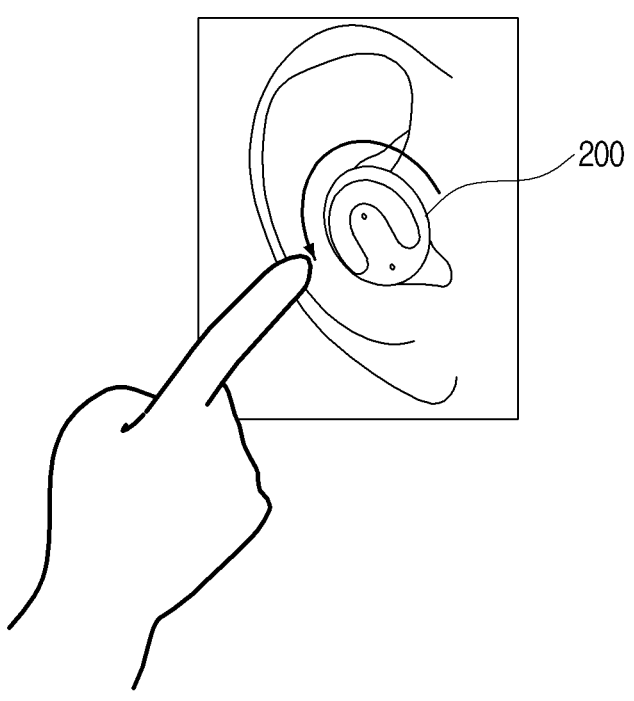
FIG. 6C is a diagram for illustrating a user interaction that is input through a wearable device for controlling at least one function of an electronic device according to an embodiment of the disclosure.

FIG. 6A, FIG. 6B, and FIG. 6C are diagrams for illustrating a user interaction that is input through a wearable device for controlling at least one function of the electronic device 100 according to an embodiment of the disclosure.

Referring to FIG. 6A, a user interaction that the wearable device 200 can detect or receive through the control UI may be a touch of the user. In case the wearable device is wireless earphones, the wireless earphones may detect a user touch input that was detected through a touch type control UI 170 located on the surface.

The processor 150 may identify at least one function of the electronic device 100 corresponding to the user touch input detected through the touch type control UI of the wearable device 200.

Accordingly, the user can conveniently control the function of the electronic device 100 connected with the wearable device through the communication interface 110 by touching the control UI located on the surface of the wearable device 200.

Referring to FIG. 6B, a user interaction that the wearable device 200 can detect or receive through the control UI may be a voice of the user. In this case, the control UI may be the microphone 160. In case the wearable device is wireless earphones, the wireless earphones may detect a voice of the user that was detected through the microphone 160 located on the surface.

The processor 150 may identify at least one function of the electronic device 100 corresponding to the user voice detected through the microphone 160 of the wearable device 200. For example, the wearable device may detect a voice which is "Turn down the volume" of the user through the microphone 160, and the electronic device 100 may adjust the volume of the electronic device 100 to be smaller based on the voice which is "Turn down the volume" detected through the wearable device.

Accordingly, the user can conveniently control the function of the electronic device 100 connected with the wearable device through the communication interface 110 through the microphone 160 located on the surface of the wearable device.

Referring to FIG. 6C, a user interaction that the wearable device can detect or receive through the control UI may be a gesture of the user. In case the wearable device 200 is wireless earphones, the wireless earphones may detect a user gesture that was detected through a gesture detective type control UI 180 located on the surface. Here, the gesture may be the user's act of moving a finger in a clockwise direction or in a counter-clockwise direction along the perimeter of the control UI. However, the disclosure is not limited thereto, and a gesture that the wearable device can detect may include various gestures that the user can take through the body or a tool.

The processor 150 may identify at least one function of the electronic device 100 corresponding to the user's gesture input detected through the gesture detective type control UI of the wearable device.

Accordingly, the user can conveniently control the function of the electronic device 100 connected with the wearable device through the communication interface 110 through the gesture detective type control UI 180 located on the surface of the wearable device 200.

The processor 150 may control the display 120 to map the first user interaction information on the first control UI with the GUI for the at least one function of the electronic device 100 and the GUI for the first control UI, and display the same.

Figure 7A:
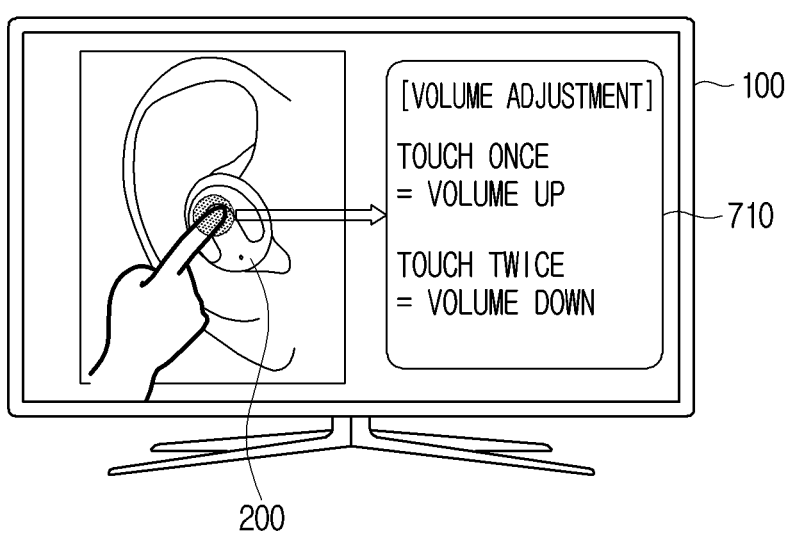
FIG. 7A is a diagram for illustrating an operation of mapping user interaction information on a control UI of a wearable device for controlling an electronic device with a GUI for at least one function of the electronic device and a GUI for a control UI and displaying the same according to an embodiment of the disclosure.
Figure 7B:
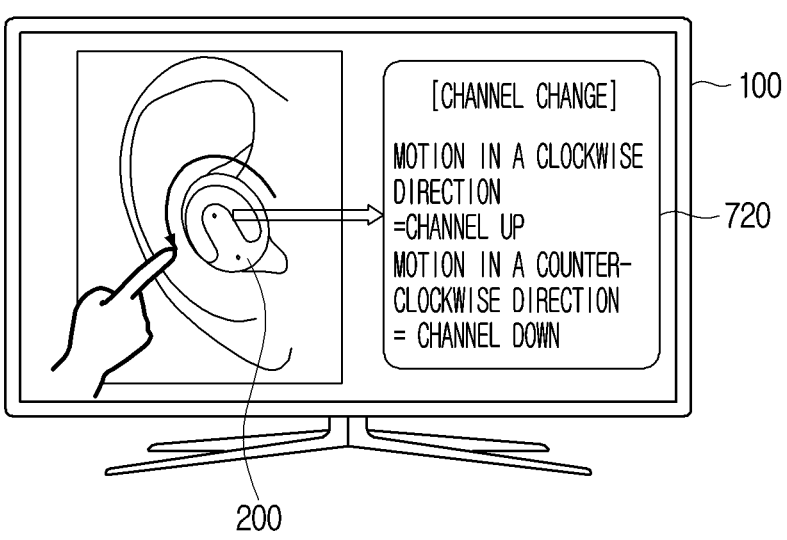
FIG. 7B is a diagram for illustrating an operation of mapping user interaction information on a control UI of a wearable device for controlling an electronic device with a GUI for at least one function of the electronic device and a GUI for a control UI and displaying the same according to an embodiment of the disclosure.

FIG. 7A and FIG. 7B are diagrams for illustrating an operation of mapping user interaction information on a control UI of a wearable device for controlling the electronic device 100 with a GUI for at least one function of the electronic device 100 and a GUI for a control UI and displaying the same according to an embodiment of the disclosure.

Referring to FIG. 7A, in case user interaction information is a user touch, the processor 150 may map information on the user touch with a GUI for a control UI of a wearable device and a GUI for volume adjustment which is the function of the electronic device 100 corresponding to the control UI, and display the same.

Specifically, in case the user touched the touch type control UI (e.g., 170) located on the surface of the wearable device once, the processor 150 may identify that it is for the function of increasing the volume of a voice output from the electronic device 100, and in case the user touched the touch type control UI located on the surface of the wearable device twice, the processor 150 may identify that it is for the function of decreasing the volume of a voice output from the electronic device 100. Also, the processor 150 may control the display 120 to map information on the user touch with the control UI of the wearable device and a GUI 710 for volume adjustment which is a function of the electronic device 100, and display the same.

Referring to FIG. 7B, in case user interaction information relates to a user gesture, the processor 150 may control the display 120 to map information on the user gesture with a GUI for a control UI of a wearable device and the channel change function which is the function of the electronic device 100 corresponding to the control UI, and display the same.

Specifically, in case a user gesture of moving in a clockwise direction along the perimeter of the gesture detective type control UI (e.g., 180) located on the surface of the wearable device 200 was detected, the processor 150 may identify that it is for a function of changing the channel of the broadcasting content output from the electronic device 100 to an upper channel, and in case a user gesture of moving in a counter-clockwise direction along the perimeter of the gesture detective type control UI located on the surface of the wearable device was detected, the processor 150 may identify that it is for a function of changing the channel to a lower channel.

According to another embodiment, the processor 150 may identify the first control UI corresponding to at least one function of the electronic device 100 based on information on the first control UI and information on a control UI of a remote control device for the electronic device 100.

Figure 8:
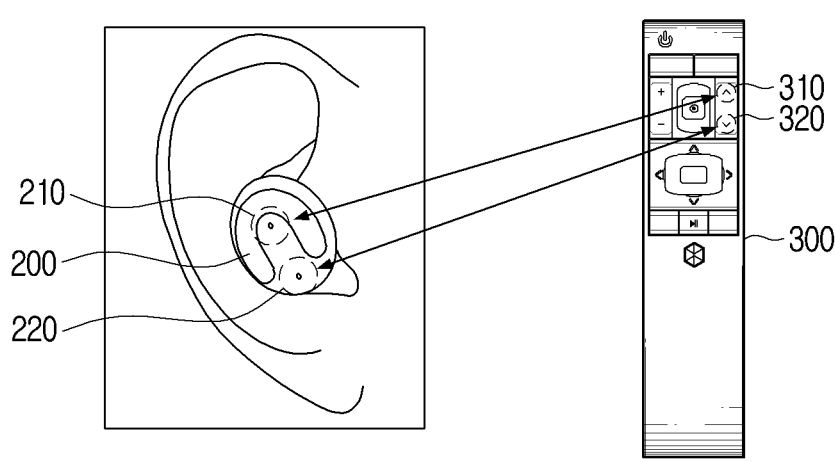
FIG. 8 is a diagram for illustrating an operation of identifying a control UI of a wearable device corresponding to at least one function of an electronic device based on information on a control UI of a remote control device for controlling the electronic device according to an embodiment of the disclosure.

FIG. 8 is a diagram for illustrating an operation of identifying a control UI of a wearable device corresponding to at least one function of the electronic device 100 based on information on a control UI of a remote control device for controlling the electronic device 100 according to an embodiment of the disclosure.

Referring to FIG. 8, the processor 150 may identify a volume increase button 310 and a volume decrease button 320 of a remote control device of which manipulation method and arrangement are similar to those of the first button 210 and the second button 220 located on the surface of the wearable device 200, and identify that the first button 210 and the second button 220 respectively correspond to the volume increase function and the volume decrease function, and control the display 120 to display such mapping information.

However, the disclosure is not limited thereto, and the processor 150 may identify at least one function of the electronic device 100 corresponding to the control UI of the wearable device such that the control UI of the wearable device and the control UI of the remote control device are manipulated by similar methods.

Figure 9:
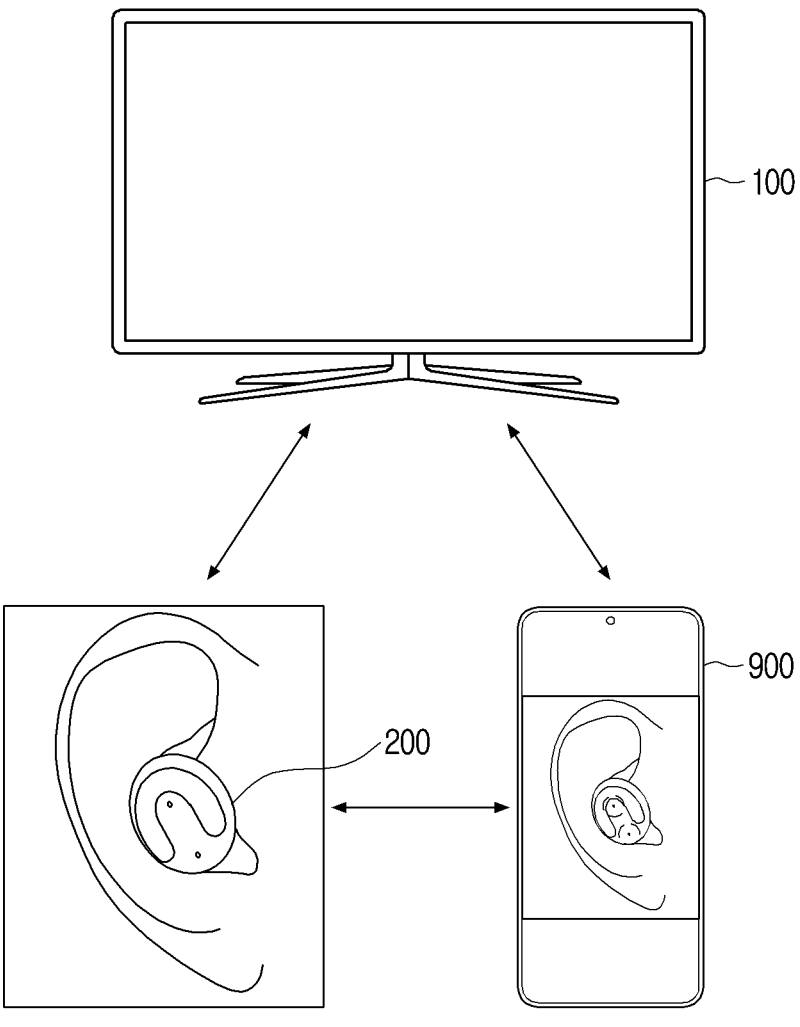
FIG. 9 is a diagram for illustrating an operation of an electronic device of mapping a GUI for at least one function of the electronic device and a GUI for a control UI of a wearable device based on information received from a user terminal and displaying the same according to an embodiment of the disclosure.

FIG. 9 is a diagram for illustrating an operation of the electronic device 100 of mapping a GUI for at least one function of the electronic device 100 and a GUI for a control UI of a wearable device based on information received from a user terminal and displaying the same according to an embodiment of the disclosure.

In embodiments where it is identified that the wearable device has control authority for at least one function of the electronic device 100 according to a user instruction, the processor 150 may receive information on the at least one function of the electronic device 100 and the first control UI corresponding to the at least one function of the electronic device 100 from a user terminal performing communicative connection with the wearable device.

The processor 150 may control the display 120 to map a GUI for the at least one function of the electronic device 100 and a GUI for the first control UI corresponding to the at least one function of the electronic device 100 based on the information received from the user terminal, and display the same.

Here, the information received from the user terminal may include information provided from a control application of the wearable device executed in the user terminal.

The processor 150 may transmit information on a content to the wearable device through the communication interface 110 such that the content is output through the wearable device.

If a control request of the wearable device for an external device is received while the content is being output through the wearable device, the processor 150 may control the wearable device to perform a control function for the external device.

Figure 10:
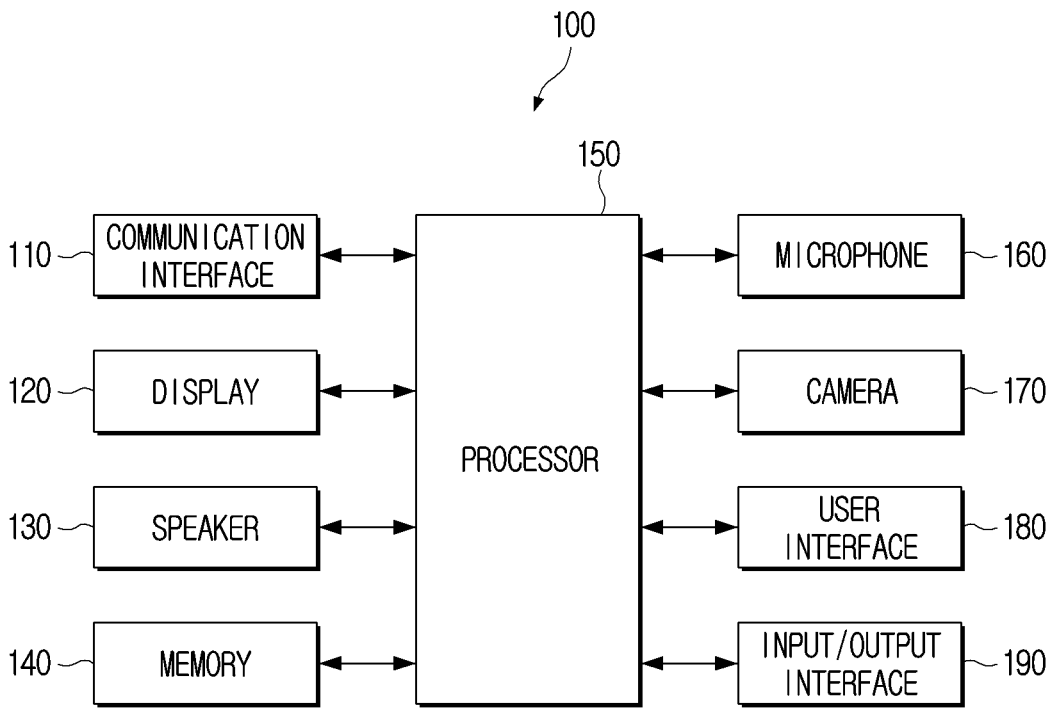
FIG. 10 is a block diagram for illustrating a configuration of an electronic device according to an embodiment of the disclosure.

FIG. 10 is a block diagram for illustrating a configuration of the electronic device 100 according to an embodiment of the disclosure.

Referring to FIG. 10, the electronic device 100 may further include additional device components other than the device components described above with reference to FIG. 2. For example, the electronic device 100 may further include a microphone 160, a camera 170, a user interface 180, and an input/output interface 190.

The microphone 160 may mean a module that obtains a sound and converts it into an electric signal, and it may be a condenser microphone 160, a ribbon microphone 160, a moving coil microphone 160, a piezoelectric element microphone 160, a carbon microphone 160, and a micro electro mechanical system (MEMS) microphone 160. Also, the microphone 160 may be implemented by methods such as a non-directional method, a bi-directional method, a uni-directional method, a sub cardioid method, a super cardioid method, and a hyper cardioid method.

The processor 150 may obtain information on a voice instruction of the user through the microphone 160. The processor 150 may identify whether to make a wearable device have control authority for the electronic device 100 based on the obtained information on the voice instruction of the user.

Also, the processor 150 may identify at least one function of the electronic device 100 corresponding to a control UI of the wearable device based on the obtained information on the voice instruction of the user. For example, the processor 150 may identify that the control UI located in one area of the wearable device corresponds to a function regarding volume adjustment among the functions of the electronic device 100 based on the obtained information on the voice instruction of the user.

Other than the above, the processor 150 may obtain voice data by receiving various voices regarding control of the electronic device 100 and the wearable device through the microphone 160.

The camera 170 may photograph an image, a still image, and a moving image for the surroundings of the electronic device 100 or the user located around the electronic device 100. According to an embodiment, the camera module may include one or more lenses, an image sensor, an image signal processor, or a flash.

The processor 150 may identify whether the user wearing a wearable device that performs communicative connection through the communication interface 110 is located around the electronic device 100 based on an image obtained through the camera 170.

In embodiments where it is identified that the user wearing the wearable device is not located around the electronic device 100, the processor 150 may not allow control authority for at least one function of the electronic device 100 through the wearable device.

Also, in this process, the processor 150 may identify whether the user is located around the electronic device 100 based on an output value obtained by inputting the image obtained through the camera 170 into a neural network model (e.g.: an image classification model).

The user interface 180 may include a button type interface, a lever type interface, a switch type interface, a sensor type interface, a touch type interface, etc., and the touch type interface may be implemented by a method of receiving an input by the user's touch on the screen of the display 120.

The processor 150 of the electronic device 100 may receive a user input through the user interface 180. Specifically, the processor 150 may receive a user input through the user interface 180, and control the display 120 to output video contents and various types of UIs, or control the speaker 130 to output voices.

Other than a case of receiving a control signal by performing communicative connection with a remote control device, a wearable device, a user terminal, etc., the processor 150 may directly receive a control signal from the user through the user interface 180 included in the electronic device 100.

The processor 150 may perform an operation regarding control of the wearable device and at least one function of the electronic device 100 based on a user instruction that was input or received through the user interface 180.

The input/output interface 190 may be provided to be connectable to another device provided separately from the electronic device 100, e.g., an external storage device. For example, the input/output interface 190 may be a universal serial bus (USB) terminal, and other than that, it may be an interface of any one of a high definition multimedia interface (HDMI), a mobile high-definition link (MHL), a universal serial bus (USB), a display port (DP), Thunderbolt, a video graphics array (VGA) port, an RGB port, a D-subminiature (D-SUB), or a digital visual interface (DVI).

The input/output interface 190 may input or output at least one of an audio signal or a video signal. Depending on implementation examples, the input/output interface 190 may include a port outputting only audio signals and a port outputting only video signals as separate ports, or it may be implemented as one port that inputs and outputs both audio signals and video signals.

The processor 150 may be connected with an external device through the input/output interface 190, and transmit/receive various signals regarding control of at least one function of the electronic device 100 through the wearable device.

FIG. 11 is a flow chart for illustrating an operation of the electronic device 100 according to an embodiment of the disclosure.

Referring to FIG. 11, the electronic device 100 may identify whether a wearable device connected through the communication interface 110 is a device having a control UI function in the operation S1110.

If the wearable device connected through the communication interface 110 is identified as a device having the control UI function, the electronic device 100 may control at least one of the display 120 or the speaker 130 to provide a request for identifying whether to make the wearable device have control authority for at least one function of the electronic device 100 in the operation S1120.

The electronic device 100 may identify at least one function of the electronic device 100 that can be controlled through the wearable device based on control information of the wearable device received from the wearable device through the communication interface 110.

When at least one function of the electronic device 100 that can be controlled through the wearable device is identified, the electronic device 100 may control the display 120 to display a list for the identified at least one function of the electronic device 100.

The electronic device 100 may identify at least one control function of the electronic device 100 for which the wearable device has control authority among the at least one function of the electronic device 100 included in the list based on a user input.

In embodiments where it is identified that the wearable device has control authority for at least one function of the electronic device 100 according to a user instruction, the electronic device 100 may identify a first control UI of the wearable device corresponding to the at least one function of the electronic device 100 in the operation S1130.

When the at least one function of the electronic device 100 for which the wearable device has control authority is identified, the electronic device 100 may identify first user interaction information regarding the first control UI corresponding to each of the at least one function of the electronic device 100.

The electronic device 100 may identify the first control UI corresponding to the at least one function of the electronic device 100 based on information on the first control UI and information on a control UI of a remote control device for the electronic device 100.

Here, the information on the control UI of the remote control device may be user interaction information on the control UI of the remote control device and information on at least one function of the electronic device 100 corresponding to the control UI.

The electronic device 100 may control the display 120 to map a GUI for the at least one function of the electronic device 100 and a GUI for the first control UI corresponding to the at least one function of the electronic device 100, and display the same in the operation S1140.

The electronic device 100 may control the display 120 to map the first user interaction information on the first control UI with the GUI for the at least one function of the electronic device 100 and the GUI for the first control UI, and display the same.

When the user interaction information input from the wearable device through the first control UI is received, the electronic device 100 may control the electronic device 100 based on the user interaction information and the at least one function of the electronic device 100 corresponding to the first control UI in the operation S1150.

According to an embodiment of the disclosure, the method according to the various embodiments disclosed herein may be provided while being included in a computer program product. A computer program product refers to a product, and it can be traded between a seller and a buyer. A computer program product can be distributed in the form of a storage medium that is readable by machines (e.g.: compact disc read only memory (CD-ROM)), or may be distributed directly between two user devices (e.g.: smartphones), and distributed on-line (e.g.: download or upload) through an application store (e.g.: Play Store™). In the case of on-line distribution, at least a portion of a computer program product (e.g.: a downloadable app) may be stored in a storage medium such as the server of the manufacturer, the server of the application store, and the memory of the relay server at least temporarily, or may be generated temporarily.

Also, while preferred embodiments of the disclosure have been shown and described, the disclosure is not limited to the aforementioned specific embodiments, and it is apparent that various modifications may be made by those having ordinary knowledge in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic device comprising:

a communication interface;

a display;

a speaker;

memory storing at least one instruction; and at least one processor configured to execute the at least one instruction, wherein the at least one processor is configured to:

identify whether a wearable device connected through the communication interface has a control user interface (UI) function, based on identifying that the wearable device connected through the communication interface has the control UI function, control at least one of the display or the speaker to provide a request for identifying whether the wearable device has control authority associated with at least one function of the electronic device, based on receiving a first control signal authorizing a control authority of the wearable device from a remote control device, identify that the wearable device has the control authority associated with the at least one function of the electronic device, based on identifying that the wearable device has the control authority associated with the at least one function of the electronic device, identify a first control UI of the wearable device corresponding to the at least one function of the electronic device, control the display to display a graphical user interface (GUI) for the at least one function of the electronic device and a GUI for the first control UI corresponding to the at least one function of the electronic device, and in response to receiving user interaction information input from the wearable device and associated with the first control UI, control the electronic device based on the user interaction information and the at least one function of the electronic device.

2. The electronic device of claim 1, wherein the at least one processor is configured to:

based on identifying the at least one function of the electronic device associated with which the wearable device has the control authority, identify first user interaction information associated with the first control UI corresponding to each of the at least one function of the electronic device, and for each of the at least one function of the electronic device, control the display to map the first user interaction information with reference to the GUI for the at least one function of the electronic device and the GUI for the first control UI, and display the first user interaction information with reference to the GUI for the at least one function of the electronic device and the GUI for the first control UI.

3. The electronic device of claim 1, wherein the at least one processor is configured to:

identify the first control UI of the wearable device corresponding to the at least one function of the electronic device based on information on the first control UI and information on a control UI of the remote control device for the electronic device.

4. The electronic device of claim 3, wherein the information on the control UI of the remote control device is user interaction information on the control UI of the remote control device and information on at least one function of the electronic device corresponding to the control UI.

5. The electronic device of claim 1, wherein the at least one processor is configured to:

identify one or more functions of the electronic device that can be controlled through the wearable device based on control information of the wearable device, based on identifying the one or more functions of the electronic device that can be controlled through the wearable device, control the display to display a list for the one or more functions of the electronic device, and identify the at least one function of the electronic device associated with which the wearable device has control authority among the one or more functions of the electronic device included in the list based on a user input.

6. The electronic device of claim 1, wherein the at least one processor is configured to:

based on identifying that the wearable device has control authority associated with the at least one function of the electronic device in response to a user instruction, receive information on the at least one function of the electronic device and information on the first control UI corresponding to the at least one function of the electronic device from a user terminal performing communicative connection with the wearable device, and control the display to display a GUI for the at least one function of the electronic device and a GUI for the first control UI corresponding to the at least one function of the electronic device based on the information received from the user terminal.

7. The electronic device of claim 6, wherein the information received from the user terminal comprises:

information provided from a control application of the wearable device executed in the user terminal.

8. The electronic device of claim 1, wherein the at least one processor is configured to:

transmit information on a content to the wearable device through the communication interface such that the content is output through the wearable device, and based on identifying a control request of the wearable device for an external device while the content is being output through the wearable device, control the wearable device to perform a control function for the external device.

9. The electronic device of claim 1, wherein the user interaction comprises:

at least one of touch reception, voice reception, or motion recognition.

10. A control method of an electronic device, the method comprising:

identifying whether a wearable device connected through a communication interface has a control user interface (UI) function;

based on identifying that the wearable device connected through the communication interface has the control UI function, controlling at least one of a display or a speaker to provide a request for identifying whether the wearable device has control authority associated with at least one function of the electronic device;

based on receiving a first control signal authorizing a control authority of the wearable device from a remote control device, identifying that the wearable device has the control authority associated with the at least one function of the electronic device;

based on identifying that the wearable device has the control authority associated with the at least one function of the electronic device, identifying a first control UI of the wearable device corresponding to the at least one function of the electronic device;

controlling the display to display a graphical user interface (GUI) for the at least one function of the electronic device and a GUI for the first control UI corresponding to the at least one function of the electronic device, and in response to receiving user interaction information input from the wearable device and associated with the first control UI, controlling the electronic device based on the user interaction information and the at least one function of the electronic device.

11. The control method of claim 10, wherein the identifying the first control UI comprises:

based on identifying the at least one function of the electronic device associated with which the wearable device has the control authority, identifying first user interaction information associated with the first control UI corresponding to each of the at least one function of the electronic device, and the controlling the display comprises:

for each of the at least one function of the electronic device, controlling the display to map the first user interaction information with reference to the GUI for the at least one function of the electronic device and the GUI for the first control UI, and display the first user interaction information with reference to the GUI for the at least one function of the electronic device and the GUI for the first control UI.

12. The control method of claim 10, wherein the identifying the first control UI comprises:

identifying the first control UI of the wearable device corresponding to the at least one function of the electronic device based on information on the first control UI and information on a control UI of the remote control device for the electronic device.

13. The control method of claim 12, wherein the information on the control UI of the remote control device is user interaction information on the control UI of the remote control device and information on at least one function of the electronic device corresponding to the control UI.

14. The control method of claim 10, wherein the controlling at least one of the display or the speaker to provide the request for identifying comprises:

identifying one or more functions of the electronic device that can be controlled through the wearable device based on control information of the wearable device;

based on identifying the one or more functions of the electronic device that can be controlled through the wearable device, controlling the display to display a list for the one or more functions of the electronic device; and identifying the at least one function of the electronic device associated with which the wearable device has control authority among the one or more functions of the electronic device included in the list based on a user input.

15. A non-transitory computer readable recording medium storing computer instructions that, when executed by at least one processor of an electronic device, collectively or individually, cause the electronic device to:

identify whether a wearable device connected through a communication interface has a control user interface (UI) function;

based on identifying that the wearable device connected through the communication interface has the control UI function, control at least one of a display or a speaker to provide a request for identifying whether the wearable device has control authority associated with at least one function of the electronic device;

based on receiving a first control signal authorizing a control authority of the wearable device from a remote control device, identify that the wearable device has the control authority associated with the at least one function of the electronic device;

based on identifying that the wearable device has the control authority associated with the at least one function of the electronic device, identifying a first control UI of the wearable device corresponding to the at least one function of the electronic device;

controlling the display to display a graphical user interface (GUI) for the at least one function of the electronic device and a GUI for the first control UI corresponding to the at least one function of the electronic device, and in response to receiving user interaction information input from the wearable device and associated with the first control UI, controlling the electronic device based on the user interaction information and the at least one function of the electronic device.

16. The non-transitory computer-readable medium as claimed in claim 15, wherein the identifying the first control UI comprises:

based on identifying the at least one function of the electronic device associated with which the wearable device has the control authority, identifying first user interaction information associated with the first control UI corresponding to each of the at least one function of the electronic device, and the controlling the display comprises:

for each of the at least one function of the electronic device, controlling the display to map the first user interaction information with reference to the GUI for the at least one function of the electronic device and the GUI for the first control UI, and display the first user interaction information with reference to the GUI for the at least one function of the electronic device and the GUI for the first control UI.

17. The non-transitory computer-readable medium as claimed in claim 15, wherein the identifying the first control UI comprises:

identifying the first control UI of the wearable device corresponding to the at least one function of the electronic device based on information on the first control UI and information on a control UI of the remote control device for the electronic device.

18. The non-transitory computer-readable medium as claimed in claim 17, wherein the information on the control UI of the remote control device is user interaction information on the control UI of the remote control device and information on at least one function of the electronic device corresponding to the control UI.

19. The non-transitory computer-readable medium as claimed in claim 15, wherein the controlling at least one of the display or the speaker to provide the request for identifying comprises:

identifying one or more functions of the electronic device that can be controlled through the wearable device based on control information of the wearable device;

based on identifying the one or more functions of the electronic device that can be controlled through the wearable device, controlling the display to display a list for the one or more functions of the electronic device; and identifying the at least one function of the electronic device associated with which the wearable device has control authority among the one or more functions of the electronic device included in the list based on a user input.

20. The non-transitory computer-readable medium as claimed in claim 15, wherein the identifying the first control UI comprises:

based on identifying that the wearable device has control authority associated with the at least one function of the electronic device in response to a user instruction, receiving information on the at least one function of the electronic device and information on the first control UI corresponding to the at least one function of the electronic device from a user terminal performing communicative connection with the wearable device, and the controlling the display comprises:

controlling the display to display a GUI for the at least one function of the electronic device and a GUI for the first control UI corresponding to the at least one function of the electronic device based on the information received from the user terminal.

* * * * *